(12) United States Patent
Suemori et al.

(10) Patent No.: US 7,233,449 B2
(45) Date of Patent: Jun. 19, 2007

(54) LENS MOVING MECHANISM AND IMAGING APPARATUS

(75) Inventors: Ryoji Suemori, Aichi (JP); Ryosuke Tsuru, Tokyo (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 11/485,308

(22) Filed: Jul. 13, 2006

(65) Prior Publication Data

US 2007/0019307 A1    Jan. 25, 2007

(30) Foreign Application Priority Data

Jul. 20, 2005    (JP)    ............................. 2005-209526

(51) Int. Cl.
G02B 7/02    (2006.01)
G02B 15/14    (2006.01)
G03B 17/00    (2006.01)
G03B 33/00    (2006.01)

(52) U.S. Cl. ...................... 359/824; 359/814; 359/823; 359/694; 359/696; 396/72; 396/75; 396/85; 396/86; 310/13; 310/14; 310/15

(58) Field of Classification Search ................ 359/811, 359/814, 823, 824, 694–700; 396/72, 73, 396/75, 79, 85, 86, 661; 310/12–15, 68 B, 310/156.26, 164, 216, 254; 348/208.7, 357, 348/374

See application file for complete search history.

(56) References Cited

U.S. PATENT DOCUMENTS

| | | | | |
|---|---|---|---|---|
| 5,134,326 A | * | 7/1992 | Sakamoto | .................... 310/14 |
| 5,182,481 A | * | 1/1993 | Sakamoto | .................... 310/13 |
| 5,200,776 A | * | 4/1993 | Sakamoto | .................... 396/86 |
| 5,241,422 A | * | 8/1993 | Shimada et al. | ............. 359/694 |
| 5,289,318 A | * | 2/1994 | Sekine et al. | ................ 359/813 |
| 5,499,143 A | * | 3/1996 | Sakamoto et al. | ........... 359/824 |
| 5,572,372 A | * | 11/1996 | Sekine et al. | ................ 359/824 |
| 5,828,503 A | * | 10/1998 | Kaneda et al. | .............. 359/824 |
| 5,860,030 A | * | 1/1999 | Tada et al. | ..................... 396/72 |
| 5,905,598 A | * | 5/1999 | Shimada et al. | ............. 359/694 |
| 6,819,500 B2 | * | 11/2004 | Tsuzuki | ....................... 359/696 |
| 7,061,689 B2 | * | 6/2006 | Ichinose et al. | ............ 359/696 |
| 7,113,351 B2 | * | 9/2006 | Hovanky | ..................... 359/824 |

FOREIGN PATENT DOCUMENTS

JP    2002-169073 A    6/2002

* cited by examiner

*Primary Examiner*—Loha Ben
(74) *Attorney, Agent, or Firm*—Radar Fishman & Grauer PLLC; Ronald P. Kananen (57) ABSTRACT

A lens moving mechanism which includes a moving lens for zooming or focusing; a lens holder holding the moving lens in a lens-barrel, and being supported freely movably into an optical axis direction of the moving lens; a guide shaft guiding the lens holder into the optical axis direction of the moving lens when the lens holder moves; a drive magnet attached to the lens holder; a drive coil fixed to the lens-barrel with at least part of the drive coil opposed to the drive magnet and giving an impelling force into the optical axis direction to the lens holder by being electrified; and a magnetic body fixed to the lens-barrel and located to oppose to the drive magnet on an opposite side of the drive magnet with at least a part of the drive coil put between the magnetic body and the drive magnet, and attracting the drive magnet.

3 Claims, 6 Drawing Sheets

LENS MOVING MECHANISM AND IMAGING APPARATUS

CROSS REFERENCES TO RELATED APPLICATIONS

The present document contains subject matter related to Japanese Patent Application JP 2005-209526 filed in the Japanese Patent Office on Jul. 20, 2005, the entire contents of which being incorporated herein by reference.

BACKGROUND OF THE INVENTION

1. Field of the Invention

The present invention relates to the technical fields of a lens moving mechanism and an imaging apparatus and more particular, to the technical field of achieving a reduction of power consumption and the prevention of backlash at the time of a movement of a lens holder by providing a magnetic body attracting a drive magnet attached to the lens holder.

2. Description of the Related Art

As disclosed in Japanese Patent Application Publication (KOKAI) No. 2002-169073, some imaging apparatuses, such as a video camera and a still camera severally have a moving lens for zooming or focusing in a lens-barrel that is held in a lens holder.

In the imaging apparatus described in the patent document JPA No. 2002-169073, a drive coil is attached to the lens holder freely movably supported by a couple of guide shafts extending in an optical axis direction, a yoke is fixed in the lens-barrel, and a drive magnet is fixed to oppose to the drive coil.

In such an imaging apparatus, when the drive coil is electrified, an impelling force into a direction according to the electrification direction is given to the lens holder by the drive magnet and the drive coil, and the lens holder and the moving lens are moved into the optical axis direction while being guided by guide shafts. Consequently, focusing adjustment or zooming adjustment is performed by the movement of the moving lens into the optical axis direction.

Now the imaging apparatus such as the video camera, the still camera frequently performs photographing in a state of being grasped by a user. The imaging apparatus is sometimes made so as to be inclined into a left, a right, an up or a down direction according to the grasping state of the user, or is a photographing angle. In some inclination direction of the imaging apparatus, the optical axis direction of the moving lens inclines to the horizontal direction. At this time, for example, if the optical axis is directed to be in the vertical direction or in a direction close to the vertical direction, the lens holder and the moving lens move into the optical axis direction (downward) owing to their self weights, and consequently the focusing adjustment and the zooming adjustment may be hindered.

Consequently, when an inclination in the optical axis direction as described above arises at the time of photographing, it is required to regulate the movement in the optical axis direction of the lens holder holding the moving lens to hold the lens holder. However, the conventional imaging apparatus performs the holding of the lens holder by constantly electrifying the drive coil. Consequently, the conventional imaging apparatus has a problem of large power consumption.

On the other hand, because a clearance for securing the smooth movement of the lens holder exists between the guide shafts and the bearing portion of the lens holder supported by the guide shafts freely slidably, the lens holder moves in the direction perpendicular to the optical axis by the clearance, and there is the possibility that a backlash of the lens holder occurs with regard to the guide shafts.

When the backlash of the lens holder occurs, the so-called image shaking phenomenon, in which a photographed image shakes, occurs. For example, a backlash quantity of several microns in the lens holder may possibly be an image shaking of a magnitude within a range of from 5 mm to 10 mm on a monitor of 21 inches.

SUMMARY OF THE INVENTION

Consequently, there is a need for overcoming the problem mentioned above by achieving the reduction of power consumption and the prevention of the backlash at the time of the movement of a lens holder in a lens moving mechanism and an imaging apparatus.

A first aspect of the present invention is a lens moving mechanism provided with a moving lens, a lens holder, a guide shaft, a drive magnet, a drive coil, and a magnetic body. The moving lens is for zooming or focusing. The lens holder holds the moving lens in an inside of a lens-barrel, and it is supported freely movably into an optical axis direction of the moving lens. The guide shaft guides the lens holder into the optical axis direction of the moving lens at a time of movement of the lens holder. The drive magnet is attached to the lens holder. The drive coil is fixed to the lens-barrel with at least a part of the drive coil opposed to the drive magnet, and it gives an impelling force into the optical axis direction to the lens holder by being electrified. The magnetic body is fixed to the lens-barrel, with the magnetic body located to oppose the drive magnet on an opposite side of the drive magnet with at least a part of the drive coil put between the magnetic body and the drive magnet, and attracts the drive magnet.

A second aspect of the present invention is an imaging apparatus provided with a lens-barrel, a lens holder, a guide shaft, a drive magnet, a drive coil, and a magnetic body. The lens-barrel has a moving lens for zooming or focusing located in an inside thereof. The lens holder holds the moving lens in the inside of the lens-barrel, and is it supported freely movably into an optical axis direction of the moving lens. The guide shaft guides the lens holder into the optical axis direction of the moving lens at a time of a movement of the lens holder. The drive magnet is attached to the lens holder. The drive coil is fixed to the lens-barrel with at least a part of the drive coil opposed to the drive magnet, and it gives an impelling force into the optical axis direction to the lens holder by being electrified. The magnetic body is fixed to the lens-barrel, with the magnetic body located to oppose the drive magnet on an opposite side of the drive magnet with at least a part of the drive coil put between the magnetic body and the drive magnet, and attracts the drive magnet.

Consequently, in the lens moving mechanism and the imaging apparatus of the present invention, the drive magnet is attracted by the magnetic body, and thereby the lens holder is pressed to the guide shaft in a direction perpendicular to the optical axis direction.

By the present invention, even in a state in which the drive coil is not electrified when the optical axis of the moving lens is inclined in the horizontal direction, the lens holder holding the moving lens does not move into the optical axis owing to its own weight, and the lens holder can be held at a desired position without electrifying the drive coil. Consequently, the reduction of power consumption can be attained.

Moreover, because the lens holder is made so as to be pressed to the guide shaft at the time of the movement of the lens holder into the direction of the optical axis, it is difficult to produce a backlash of the lens holder to the guide shaft, and the generation of an image shake can be prevented.

According to a third aspect of the present invention, the magnetic body is composed of a plurality of magnetic members extending into a movement direction of the lens holder and separated from each other in a direction perpendicular to the movement direction. Consequently, it is possible to adjust the attracting force of the magnetic body to the drive magnet by increasing or decreasing the number of the magnetic members. Thereby, the pressing force of the lens holder to the guide shaft can be set to a desired magnitude, and the movement of the lens holder into the optical axis direction can be smoothed.

DETAILED DESCRIPTION OF EMBODIMENTS

In the following, embodiments for implementing a lens moving mechanism and an imaging apparatus according to the present invention are described with reference to the attached drawings. The embodiments shown below are ones in which the imaging apparatus of the present invention is applied to a video camera, and in which the lens moving mechanism of the present invention is applied to a lens moving mechanism installed in the video camera. It is noted that the scope of the present invention is not restricted to the video camera or the lens moving mechanism installed in the video camera, but the present invention can be widely applied to various imaging apparatuses having the function of moving image photographing or still image photographing, including a still camera, or to a lens moving mechanism installed in the imaging apparatus.

Figure 1:
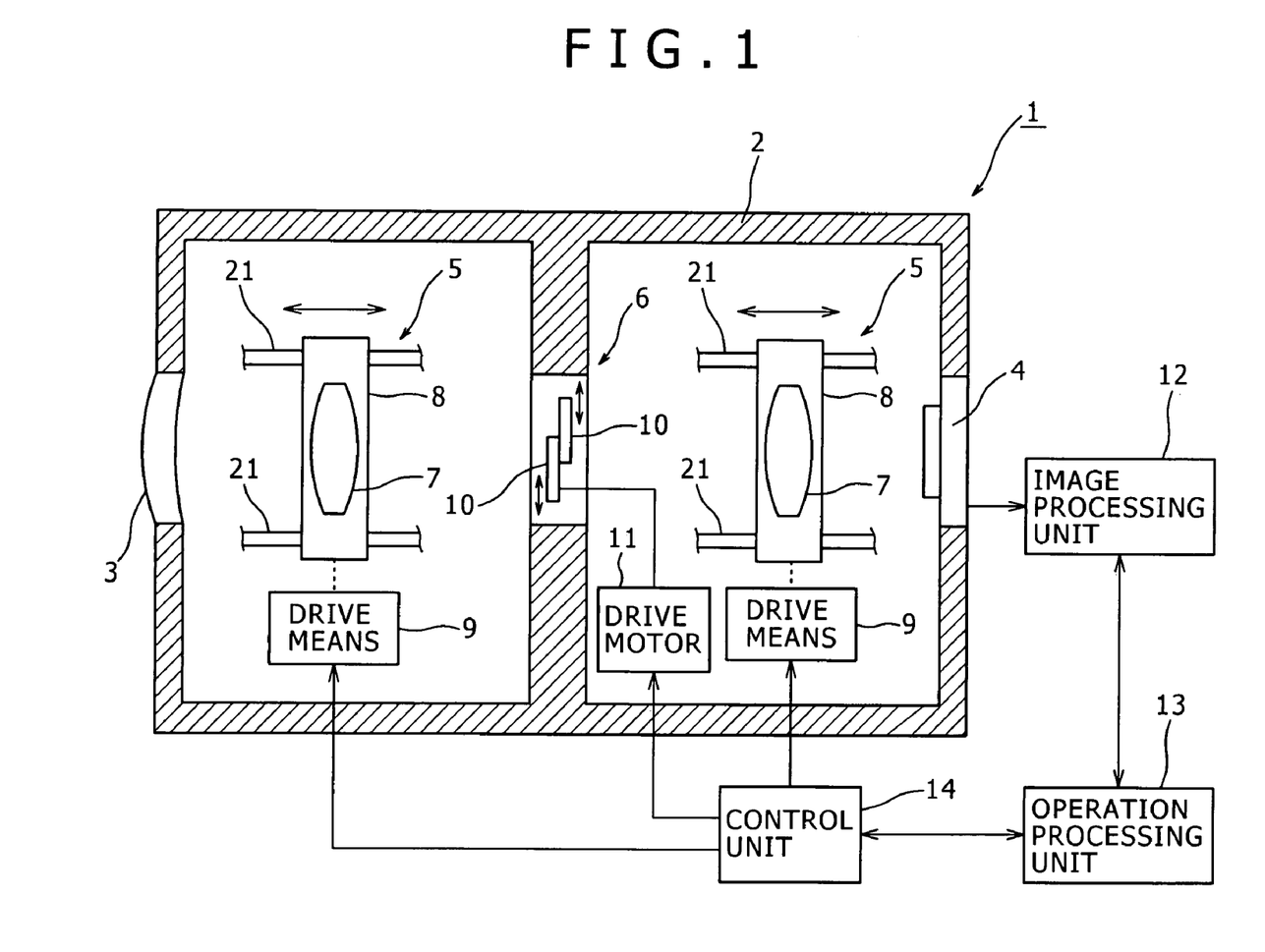
FIG. 1 is a diagram showing embodiments of a lens moving mechanism and an imaging apparatus according to the present invention together with FIGS. 2–6, FIG. 1 being a conceptual diagram showing the basic configuration of the imaging apparatus.

An imaging apparatus 1 is composed of each required unit arranged in a lens-barrel 2 provided as an outer housing (see FIG. 1). An objective lens 3 located in a front end portion, imaging means 4 such as a solid state imaging device located in a rear end portion, lens moving mechanisms 5 for zooming or focusing, and a movable mechanism 6 constituting an iris or a shutter arranged between the lens moving mechanisms 5 are arranged in the lens-barrel 2.

Each of the lens moving mechanisms 5 includes a lens holder 8 holding a moving lens 7, and drive means 9 moving the lens holder 8 into the optical axis direction of the moving lens 7.

The movable mechanism 6 includes a plurality of movable members 10 moved into the directions perpendicular to the optical axis direction of the moving lenses 7, and a drive motor 11 moving these movable members 10. The optical path of the optical system is opened and closed by the movement of the movable members 10 into mutually separating and closing directions by the driving force of the drive motor 11.

A light which passes through the objective lens 3 from a subject enters the imaging means 4 through the moving lens 7 for zooming, the optical path opened by the movement of the movable members 10, and the moving lens 7 for focusing.

An image output obtained by the imaging means 4 is sent out to an image processing unit 12, and the predetermined processing of the image output is performed by the image processing unit 12. The image processing unit 12 sends out the information necessary for control and the like to an arithmetic processing unit 13 and sends a photographed image to a view finder, a monitor and the like to make them display the photographed image, or records image information and the like onto a recording medium according to an operation instruction of a user. The arithmetic processing unit 13 including a microcomputer and the like sends out a control instruction signal to a control unit 14, and a control signal is input from the control unit 14 into the drive motor 11 of the movable mechanism 6, the drive means 9 of the lens moving mechanisms 5, and the like to control each unit.

Figure 2:
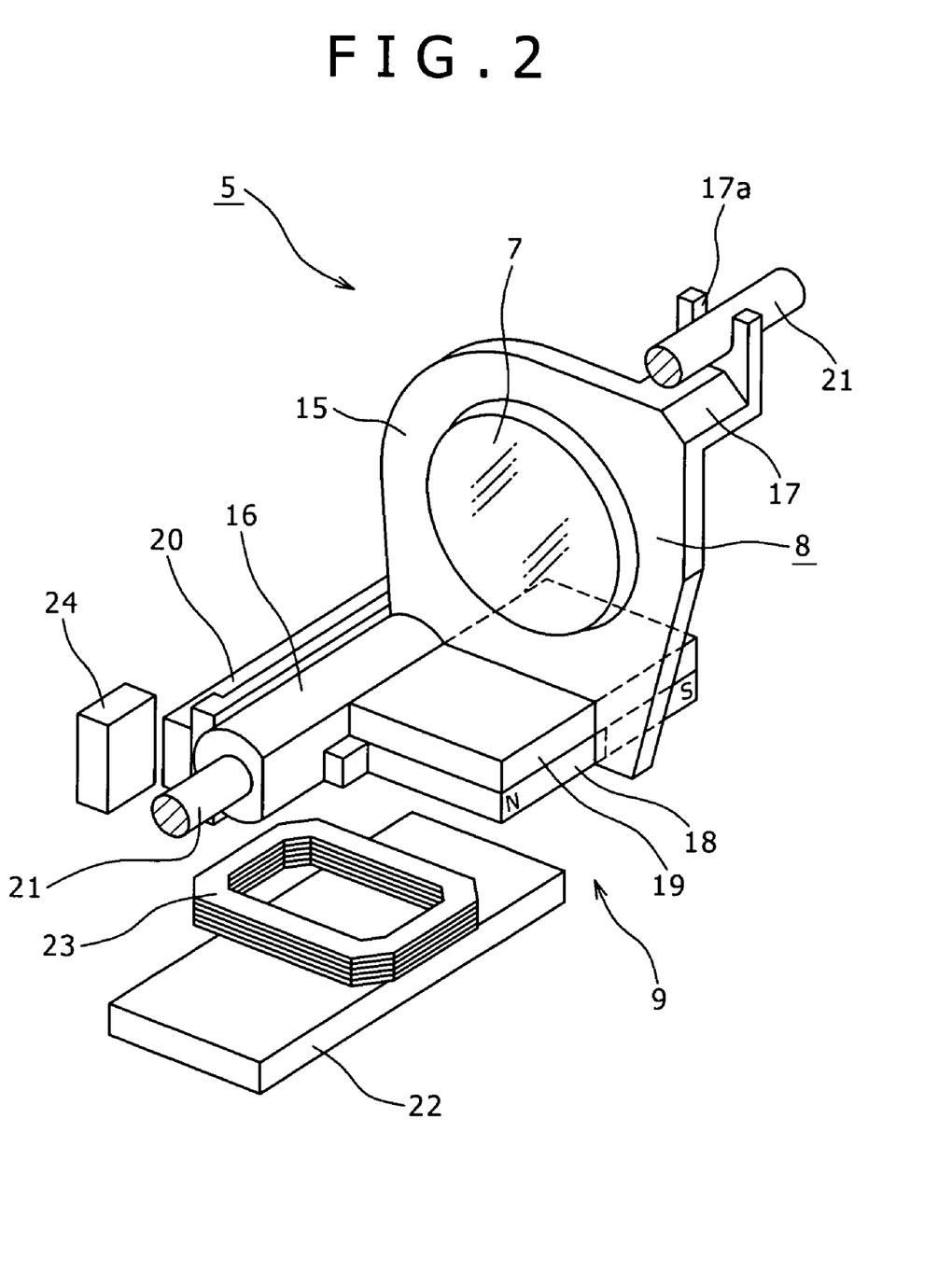
FIG. 2 is an enlarged perspective view showing a lens moving mechanism.
Figure 3:
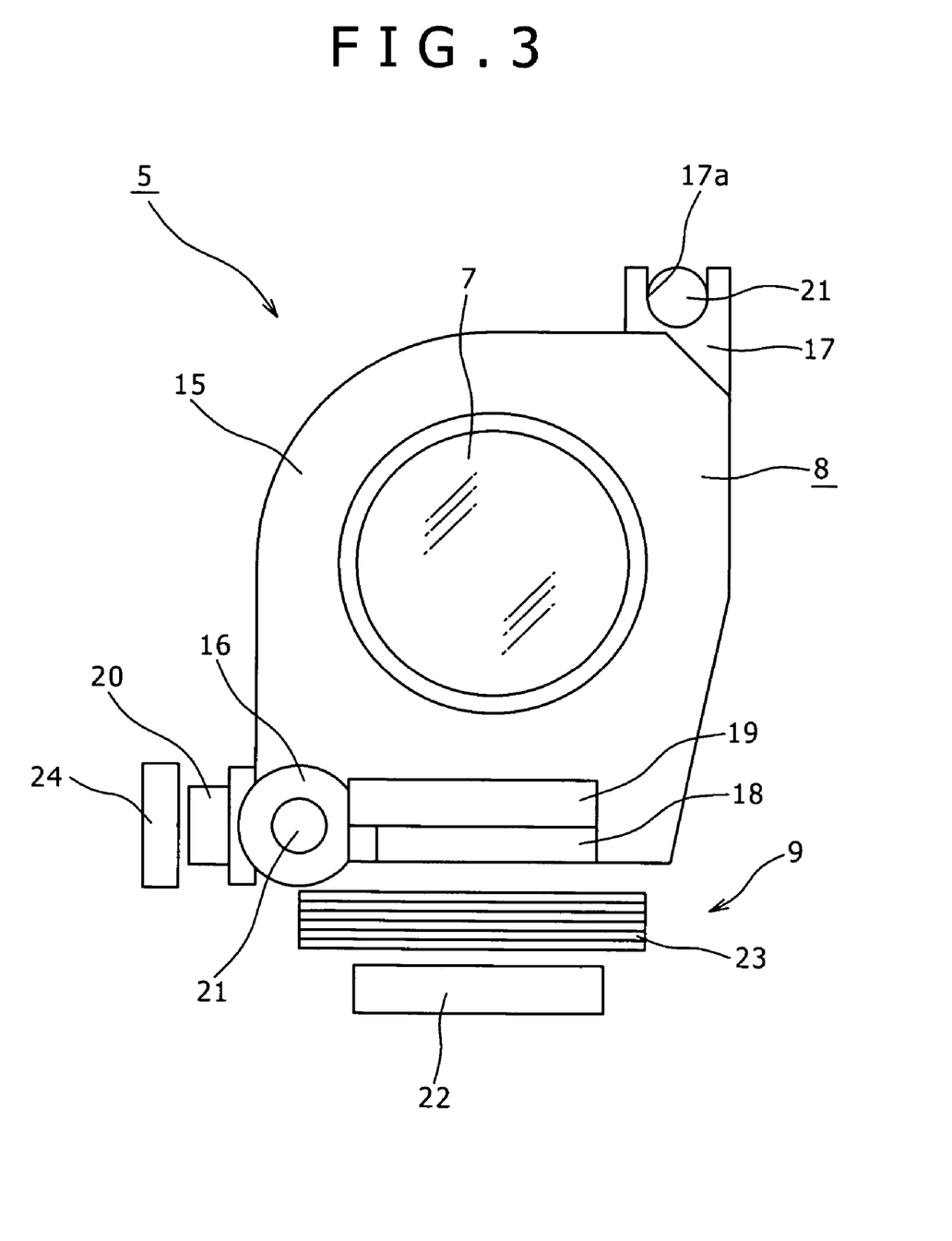
FIG. 3 is an enlarged front view showing the lens moving mechanism.

The lens holder 8, as shown in FIGS. 2 and 3, includes a lens holding unit 15 holding the moving lens 7, a sleeve unit 16 projecting from the lens holding unit 15, and a projecting unit 17 projecting from the lens holding unit 15, and the sleeve unit 16 and the projecting unit 17 are severally formed so as to extend into the optical axis direction. The sleeve unit 16 and the projecting unit 17 project from the side edges located on opposite sides to each other with the moving lens 7 of the lens holding unit 15 put between them, and a supporting groove portion 17a is formed at the end portion of the projecting unit 17.

A drive magnet 18 is attached to the end portion (the lower end portion) on the sleeve unit 16 side of the lens holder 8. The drive magnet 18 is magnetized into the N pole and the S pole into, for example, the optical axis direction.

A grounded yoke 19 formed in the same size and the same shape as those of the drive magnet 18 is attached onto a surface (upper surface) of the drive magnet 18.

A position detection magnet 20 is attached to one side surface of the sleeve unit 16 of the lens holder 8. The position detection magnet 20 is formed to be long in the optical axis direction, and have many magnetic poles formed by turns in the optical axis direction.

In the lens-barrel 2, guide shafts 21 extending into the optical axis direction are arranged (see FIG. 1). Two guide shafts 21 are arranged on opposite sides of the movable mechanism 6 put between them in the optical axis direction, and a lens holder 8 for zooming and a lens holder 8 for focusing are severally supported by the two guide shafts 21 freely movably into the optical direction. In each of the lens holders 8, as shown in FIGS. 2 and 3, one guide shaft 21 is inserted in the sleeve unit 16, and the other guide shaft 21 is inserted in the supporting groove portion 17a. Thereby, the lens holders 8 are supported by the guide shafts 21 freely slidably.

In the lens-barrel 2, a magnetic body 22 is arranged in the state of being fixed at a position opposed to the under surface of the drive magnet 18. The magnetic body 22 is formed in the shape of a rectangular plate made of a magnetic metal material, such as iron, and is formed in a size and shape similar to those of the drive magnet 18.

In the lens-barrel 2, a drive coil 23 formed in a wound shape of a substantially rectangular frame is arranged in the state of being fixed. The drive coil 23 is arranged between the drive magnet 18 and the magnetic body 22 with predetermined spaces from both of them so that the axis direction of the drive coil 23 may be directed into the direction of connecting the drive magnet 18 and the magnetic body 22 (see FIGS. 2 to 4).

In the lens-barrel 2, a magnetoresistive element 24 is arranged at a position opposed to the position detection magnet 20.

In the imaging apparatus 1 constituted as mentioned above, if a drive current is supplied to the drive coil 23, an impelling force according to the direction of the drive current in the relation between the direction of the supplied current and the magnetic poles of the drive magnet 18 is given to the lens holder 8, and the lens holder 8 is guided by the guide shafts 21 so as to be moved in the optical axis direction. Consequently, the moving lens 7 is moved in the optical axis direction together with the lens holder 8, and a zoom function or a focus function is exhibited. At this time, the resistance value of the magnetoresistive element 24 opposed to the position detection magnet 20 attached to the lens holder 8 changes with the change of the magnetic field based on the movement of the position detection magnet 20, and consequently the position of the lens holder 8 in the optical axis direction is detected.

Figure 4:
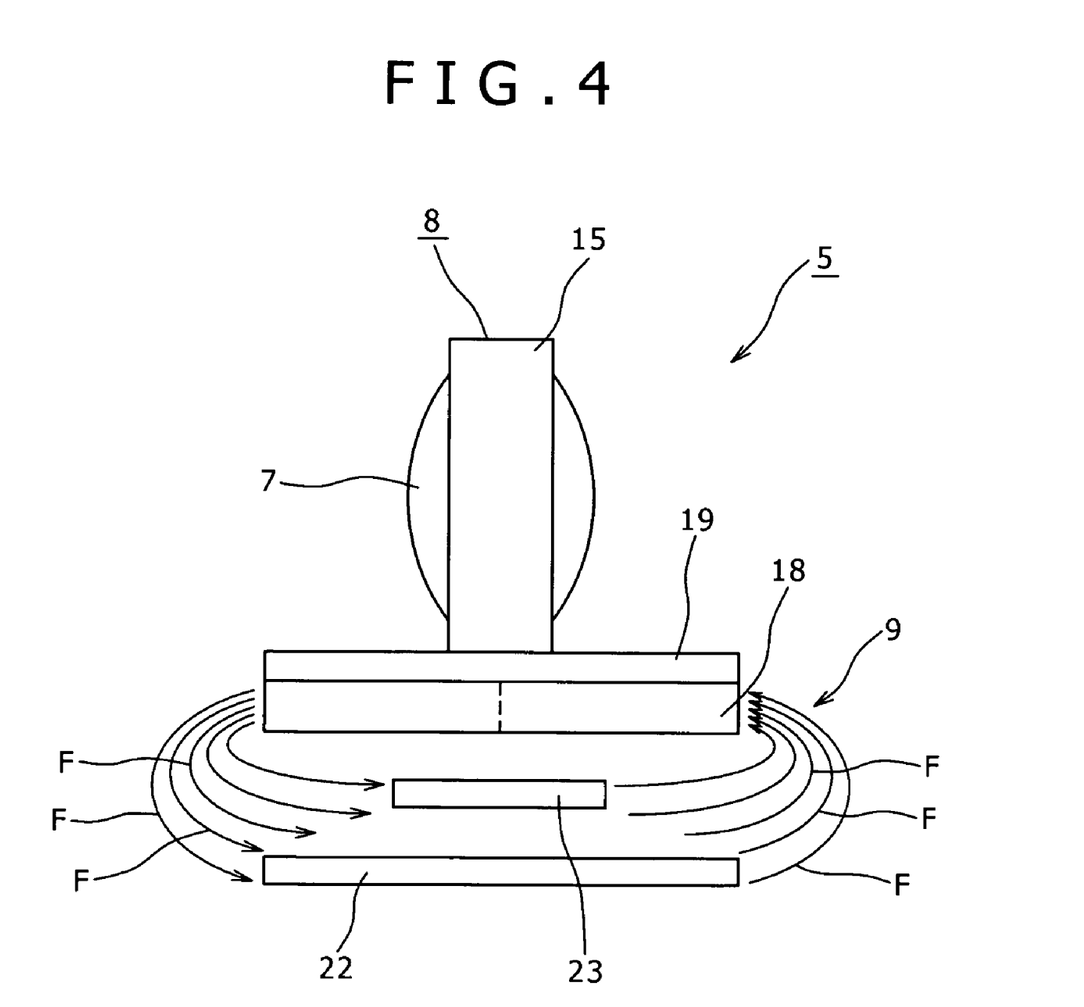
FIG. 4 is a conceptual diagram showing a state of a magnetic flux.

At the time of movement of the lens holder 8 in the optical axis direction, the so-called leakage fluxes F, which are magnetic fluxes unrelated to the movement of the lens holder 8, are generated by the drive magnet 18 (see FIG. 4). The leakage fluxes F reach the magnetic body 22 fixed to the position opposed to the drive magnet 18 with the drive coil 23 put between them, and then the drive magnet 18 is attracted by the magnetic body 22. Consequently, the lens holder 8, to which the drive magnet 18 is attached, is attracted to the magnetic body 22 side, and the lens holder 8 is moved into the optical axis direction with the inner surface of the sleeve unit 16 being pressed onto the one-side guide shaft 21.

Moreover, because the leakage fluxes F are generated unrelated to electrification to the drive coil 23, the lens holder 8 is always attracted to the magnetic body 22 side independently of the electrification state of the drive coil 23.

As described above, in the imaging apparatus 1, the magnetic body 22, which always attracts the drive magnet 18, is provided on the opposite side of the drive magnet 18 with the drive coil 23 put between them. Consequently, even in a state where no electrification is performed to the drive coil 23 when the optical axis direction inclines from the horizontal direction at the time of the use of the imaging apparatus 1, the lens holder 8, which holds the moving lens 7, does not move into the optical axis direction owing to its own weight. Consequently, because the lens holder 8 can be held at a desired position without performing any electrification of the drive coil 23, the reduction of the power consumption of the imaging apparatus 1 can be achieved.

Moreover, because the inner surface of the sleeve unit 16 is brought into a state where the inner surface is pressed against one-side guide shaft 21 at the time of the movement of the lens holder 8 in the optical axis direction, a backlash of the lens holder 8 to the guide shaft 21 is hardly produced, and the generation of an image shake can be prevented.

In addition, although the example using the position detection magnet 20 and the magnetoresistive element 24 as the means for performing the position detection of the lens holder 8 in the optical axis direction has been described above, the means for performing the position detection of the lens holder 8 in the optical axis direction is not limited to the position detection magnet 20 and the magnetoresistive element 24, and it is possible to widely use magnetic detection means other than those described above, with the detection means using optical detection, such as a hall element, and the like.

Figure 5:
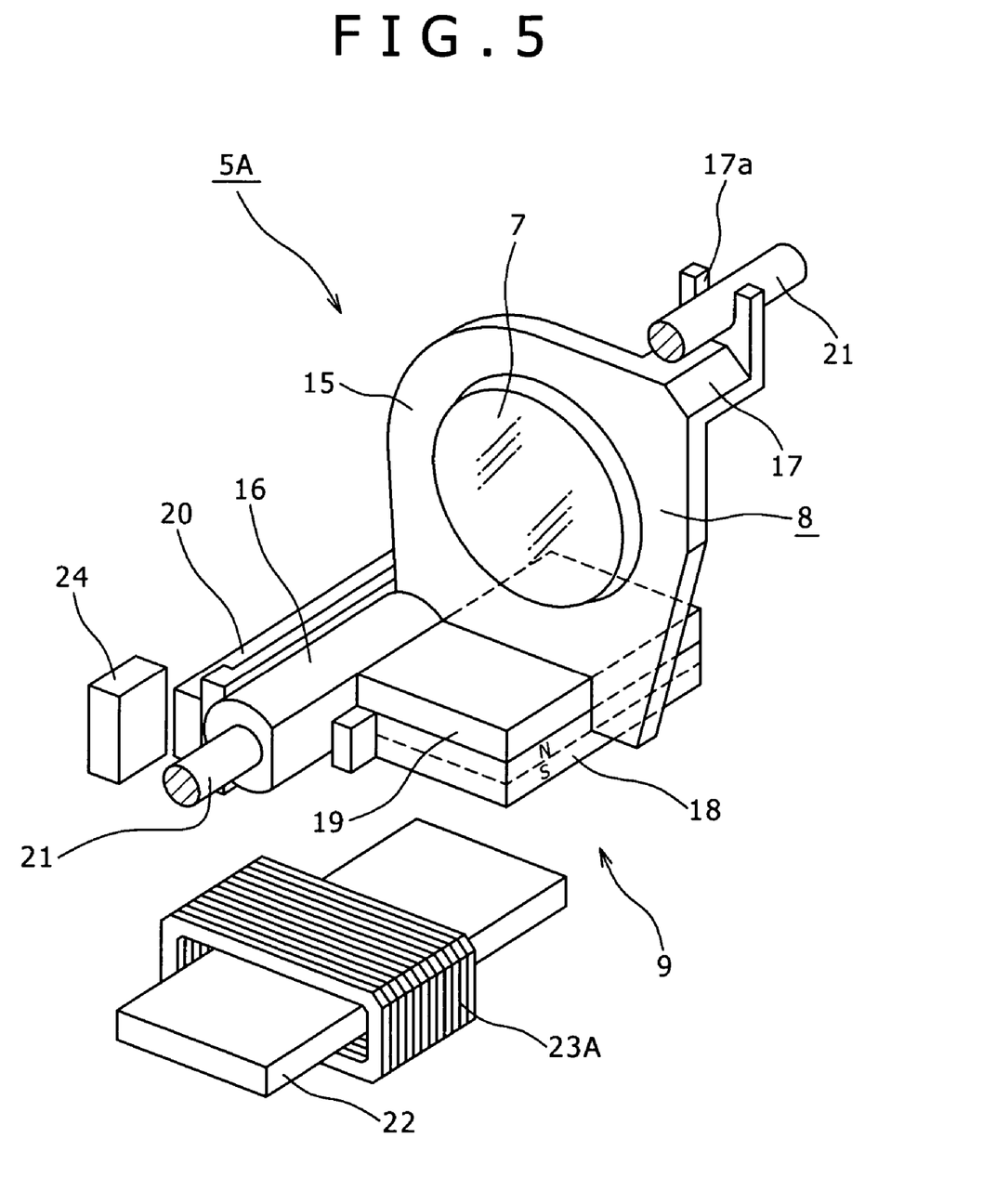
FIG. 5 is an enlarged perspective view showing another lens moving mechanism.

Although the example is one of arranging the magnetic body 22 on the opposite side of the drive magnet 18 with the whole drive coil 23 put between them, it is also possible to use a drive coil 23A arranged so that the axis direction thereof may agree with the optical axis direction as shown in FIG. 5, for example, and to use a lens moving mechanism 5A having the configuration of arranging the magnetic body 22 in a state in which the drive coil 23A is inserted by the magnetic body 22. Consequently, in the lens moving mechanism 5A, the drive magnet 18 and the magnetic body 22 are located to oppose each other with a part of the drive coil 23A put between them.

Figure 6:
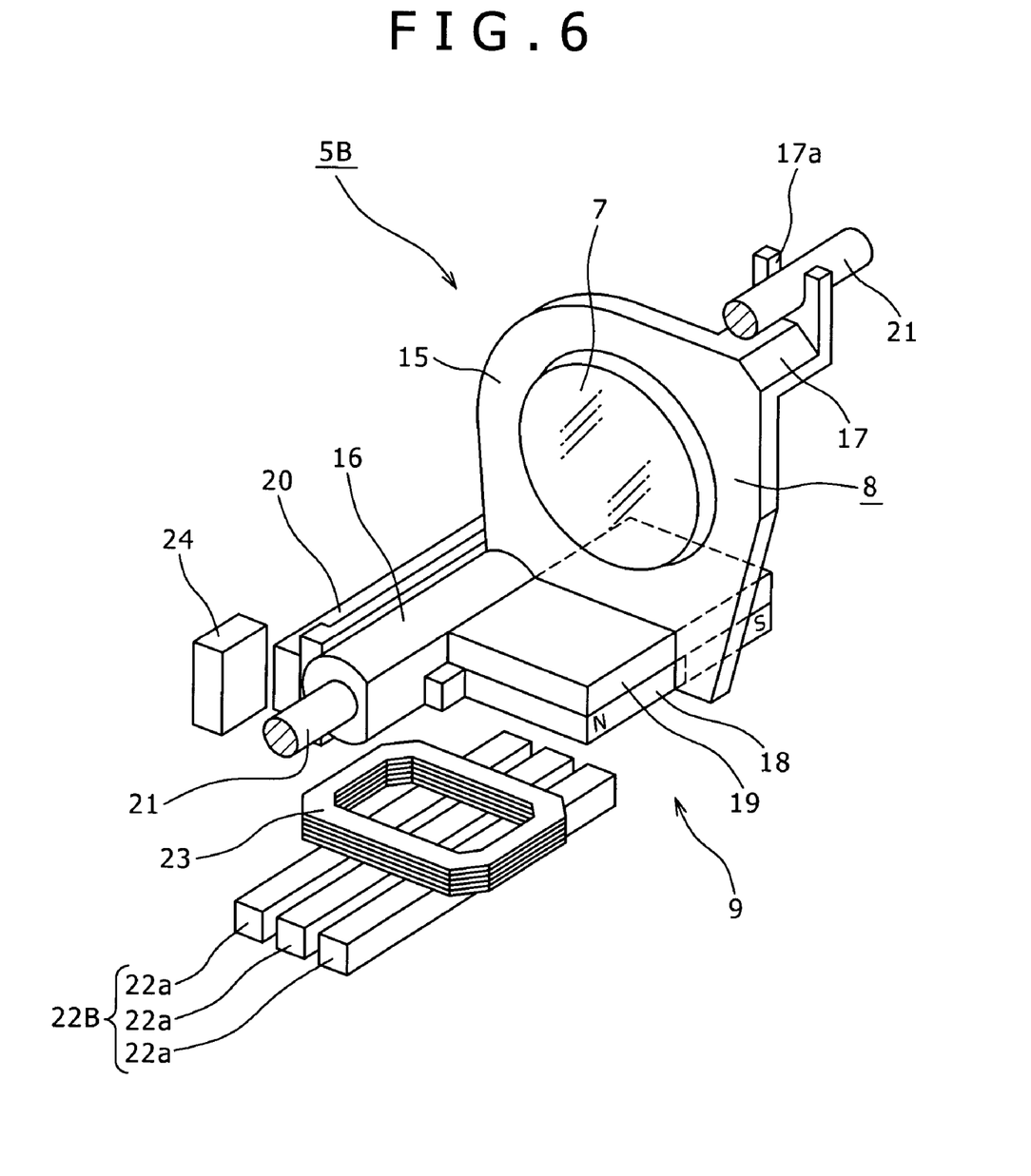
FIG. 6 is an enlarged perspective view showing another lens moving mechanism.

Moreover, as shown in FIG. 6, it is also possible to configure a lens moving mechanism 5B using a magnetic body 22B made of a plurality of rod-like magnetic members 22a. The plurality of magnetic members 22a is used as the magnetic body 22B, and the attracting force of the magnetic body 22B to the drive magnet 18 can be adjusted by increasing or decreasing the number of the magnetic members 22a. Thereby, the pressing force of the lens holder 8 to the guide shaft 21 can be set to a desired magnitude, and consequently the movement of the lens holder 9 in the optical axis direction can be smoothed. In addition, although the example using the magnetic members 22a with each having a rectangular cross section is shown in FIG. 6, the shape of the cross section and the magnitude of the cross sectional area of each of the magnetic members can be arbitrarily set, and arbitrary shapes, such as a circle, an ellipse and a triangle, for example, can be used as the shape of the cross section thereof.

Moreover, also in the lens moving mechanism 5B, it is also possible to use the drive coil 23A arranged so that the axis direction thereof may agree with the optical axis direction similarly to the lens moving mechanism 5A, and to make the magnetic members 22a be in the state of being inserted into the drive coil 23A.

In addition, in any cases of the lens moving mechanisms 5, 5A and 5B, it is possible to arbitrarily set the thicknesses, the sizes and the shapes of the magnetic bodies 22 and 22B, and thereby to adjust the attracting force of the magnetic bodies 22 and 22B to the drive magnet 18. Thereby, the pressing force of the lens holder 8 to the guide shaft 21 can be set at a desired magnitude. In particular, it is easy to perform the adjustments of the attracting forces of the magnetic bodies 22 and 22B to the drive magnet 18 by changing the thicknesses of the magnetic bodies 22 and 22B.

Any of the concrete shape and the concrete structures of each unit shown in the best modes described above are only examples of the concretization at the time of implementing the present invention, and the scope of the present invention should not be interpreted to be limited to those shapes and structures.

It should be understood by those skilled in the art that various modifications, combinations, sub-combinations and alterations may occur depending on design requirements and other factors insofar as they are within the scope of the appended claims or the equivalents thereof.

What is claimed is:

1. A lens moving mechanism, comprising:
a moving lens for zooming or focusing;
a lens holder which holds said moving lens in an inside of a lens-barrel, said lens holder supported freely movably into an optical axis direction of said moving lens;
a guide shaft which guides said lens holder into the optical axis direction of said moving lens at a time of movement of said lens holder;
a drive magnet attached to said lens holder;
a drive coil fixed to the lens-barrel with at least a part of said drive coil opposed to said drive magnet, said drive coil giving an impelling force into the optical axis direction to said lens holder by being electrified; and
a magnetic body fixed to said lens-barrel, said magnetic body located to oppose to said drive magnet on an opposite side of said drive magnet with at least a part of said drive coil put between said magnetic body and said drive magnet, said magnetic body attracting said drive magnet.

2. The lens moving mechanism according to claim 1, wherein said magnetic body is composed of a plurality of magnetic members extending into a movement direction of said lens holder and separated in a direction perpendicular to the movement direction.

3. An imaging apparatus, comprising:
a lens-barrel having a moving lens for zooming or focusing located in an inside thereof;
a lens holder which holds said moving lens in the inside of said lens-barrel, said lens holder supported freely movably into an optical axis direction of said moving lens;
a guide shaft which guides said lens holder into the optical axis direction of said moving lens at a time of a movement of said lens holder;
a drive magnet attached to said lens holder;
a drive coil fixed to said lens-barrel with at least a part of said drive coil opposed to said drive magnet, said drive coil giving an impelling force into the optical axis direction to said lens holder by being electrified; and
a magnetic body fixed to said lens-barrel, said magnetic body located to oppose to said drive magnet on an opposite side of said drive magnet with at least a part of said drive coil put between said magnetic body and said drive magnet, said magnetic body attracting said drive magnet.

* * * * *

UNITED STATES PATENT AND TRADEMARK OFFICE
CERTIFICATE OF CORRECTION

PATENT NO.        : 7,233,449 B2
APPLICATION NO.   : 11/485308
DATED             : June 19, 2007
INVENTOR(S)       : Ryoji Suemori et al.

It is certified that error appears in the above-identified patent and that said Letters Patent is hereby corrected as shown below:

Column 8, Line 3:
"located in an inside" should read -- located inside --.

Column 8, Line 4:
"lens in the inside" should read -- lens inside --

Signed and Sealed this

Eighteenth Day of September, 2007

JON W. DUDAS
*Director of the United States Patent and Trademark Office*